United States Patent [19]

Chow et al.

[11] 4,056,721
[45] Nov. 1, 1977

[54] AUTOMATIC RETICLE BRIGHTNESS CONTROL CIRCUIT MEANS IN NIGHT VISION IMAGE INTENSIFIERS

[75] Inventors: Sen-te Chow, Alexandria; Earl M. Thomas, Arlington, both of Va.

[73] Assignee: The United States of America as represented by the Secretary of the Army, Washington, D.C.

[21] Appl. No.: 721,750

[22] Filed: Sept. 9, 1976

[51] Int. Cl.$^2$ .......................... H01J 31/50; G01J 1/32
[52] U.S. Cl. ............................ 250/213 VT; 250/205; 315/10; 315/158
[58] Field of Search ............ 250/213 R, 213 VT, 205; 315/10, 12, 149, 150, 158

[56] References Cited

U.S. PATENT DOCUMENTS

| | | | |
|---|---|---|---|
| 3,666,957 | 5/1972 | Wyess | 250/213 VT |
| 3,816,744 | 6/1974 | Chow | 250/213 VT |
| 3,872,302 | 3/1975 | Fender | 250/213 VT |

*Primary Examiner*—Eugene R. LaRoche

*Attorney, Agent, or Firm*—Nathan Edelberg; Max L. Harwell; Robert P. Gibson

[57] ABSTRACT

A reticle brightness control circuit means in a night vision image intensifier in which the circuit means utilizes screen current intensity to provide a proportionate amount of current through a reticle light-emitting diode (LED) for controlling the brightness level therefrom as projected on the cathode. When the object image input brightness impinging on the cathode is less than an automatic brightness control limiting level, the screen current limiting level and the reticle LED brightness are directly controlled by the screen current. However, when the object image input brightness goes about the screen current limiting level, the brightness level of the reticle LED is further increased by a decreased feedback voltage from the microchannel plate power supply oscillator (MCP OSC) circuit which provides proportionately more current through the reticle LED wherein the brightness of the reticle image remains commensurate with the input image brightness under all input light levels.

4 Claims, 2 Drawing Figures

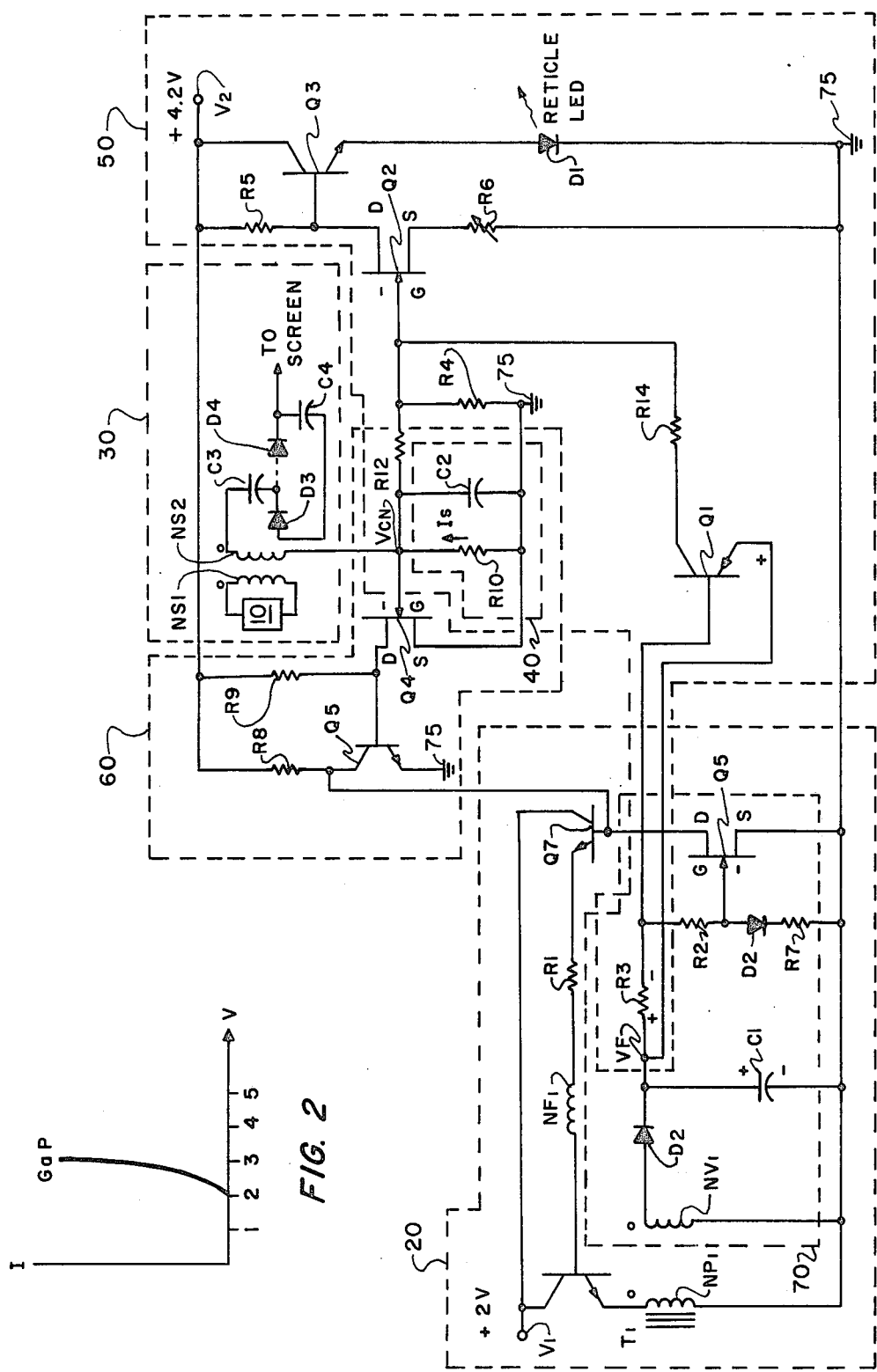

AUTOMATIC RETICLE BRIGHTNESS CONTROL CIRCUIT MEANS IN NIGHT VISION IMAGE INTENSIFIERS

The invention described herein may be manufactured, used, and licensed by the U.S. Government for governmental purposes without the payment of any royalties thereon.

BACKGROUND AND SUMMARY OF THE INVENTION

The invention relates to circuit means for providing reticle brightness in an image intensifier in which the reticle brightness is commensurate with an object image input source brightness.

Specifically, the invention comprises a reticle brightness control circuit having two common inputs thereto that control an output which regulates the voltage across a reticle LED. Both inputs to the reticle brightness control circuit are controlled by a screen current sensing circuit, one directly and the other indirectly through an automatic brightness control circuit. When the screen current increases through the automatic brightness control circuit, the indirect control limits the output voltage of the MCP OSC circuit inversely with the variations of the screen current wherein the output voltage of the MCP OSC circuit is fed back to the input of the reticle brightness control circuit for proportionately applying current through the reticle LED according to the amount of screen current.

BRIEF DESCRIPTION OF THE DRAWINGS

FIG. 1 is a schematic diagram of the automatic reticle brightness circuit means; and FIG. 2 illustrates typical voltage current curves of the cathode circuit.

DETAILED DESCRIPTION OF THE PREFERRED EMBODIMENT

Refer to FIG. 1 for the automatic reticle brightness circuit means of this invention. The n-p-n transistor base controlled MCP OSC circuit, represented by dashed lines 20, is basic to night vision image intensifiers but plays another important role in the automatic reticle LED brightness control of this invention, which role will be discussed later in this application. Also, the screen oscillator and voltage multiplier bank of capacitors and guiding diodes, which is partially represented within dashed line 30, is well known in the art for providing the high voltage multiples from a low voltage oscillator, which is represented by numeral 10, to an oscillator output such as a bank of capacitors and guiding diodes, represented by C3, D3 and C4, D4, to the screen of an image intensifier. The primary winding NP1 of transformer T1 of the MCP OSC circuit 20 steps up the +2 direct current voltage source V1 to about 500 volts peak-to-peak alternating current on secondary windings NV1. Transformer T1 may also function as the screen voltage oscillator 10 in the screen oscillator and voltage multiplier 30 by applying alternating voltages to NS1.

When the object image input brightness level increases, a microchannel plate electron multiplier (not shown) momentarily provides increased amplification due to the increase in input electrons. This additional amplification causes the screen current to increase because of the increase in electrons impinging on the screen. It is assumed here that the output electrode of the microchannel plate is at ground potential, which is usually the case in image intensifiers. As the screen current Is increases in its flow path from the screen to the grounded output electrode of the microchannel plate and back through the screen voltage multiplier section of circuit 30, the screen current Is will flow from ground potential 75 through screen current sensing circuit 40. Circuit 40 is comprised of a current sensing resistor RIO and a direct current voltage blocking capacitor C2.

Resistors R4 and R12 form a voltage divider that establishes an initial voltage to gate terminal G of an N-channel enhancement mode FET, designated as Q2. Typically, R4 is 10 megaohms resistance and R12 is 22 megaohms resistance. Another N-channel enhancement mode FET, designated by Q4, has its gate terminal G connected to ground potential 75 through current sensing resistor R10.

An automatic brightness control circuit 60 is comprised of FET Q4, n-p-n bipolar transistor Q5 and resistors R8 and R9. FET Q4 has its source terminal S at ground potential 75 and its drain terminal D connected through resistor R9 to a reticle LED direct current voltage source V2 of about +4.2 d.c. volts. The n-p-n bipolar transistor Q5 has its base terminal connected directly to the drain terminal of FET Q4 its emitter connected to ground potential, and its collector biased by source V2 through resistor R8 and further connected directly to the base of n-p-n bipolar transistor Q7 in the base drive MCP OSC circuit 20.

A reticle brightness control circuit 50 is comprised of FET Q2, n-p-n bipolar transistor Q3, resistor R5, potentiometer R6, reticle LED D1, and further comprises a feedback circuit connected between the MCP OSC circuit 20 to sense a variable feedback direct current voltage at terminal VF in MCP OSC circuit 20 and to the gate terminal of FET Q2 through a partially conducting p-n-p bipolar transistor Q1. There are then two common inputs to the gate terminal of the N-channel enhancement mode FET Q2. The first common input is derived from a node, called the common node $V_{CN}$. The voltage at $V_{CN}$ is the voltage drop across screen current sensing resistor R10 caused by the flow of screen current Is, and is in direct relation to the amount of Is. A second common input is derived from feedback terminal VF and is also in direct relation to an increased amount of screen current Is, but this time only the screen current Is past an automatic brightness control limiting level is considered. The two common inputs are superimposed on each other at the gate terminal of FET Q2 to control the conductivity of Q2 and also the conductivity of the n-p-n transistor Q3.

In the operation of the automatic reticle brightness control means, a portion of the voltage source V2 is applied to the anode of the reticle LED D1 in direct relation to the object image input source brightness level, and therefore light rays emitted from reticle LED D1 are projected on the cathode of the image intensifier in direct relation to the object image input source brightness and both are controlled simultaneously in the image intensifier. The automatic reticle brightness control means operates in the following manner. First, FET Q2 is biased to have a smaller pinch-off voltage than FET Q4. Both Q2 and Q4 are conducting before the screen current Is increases. When Is increases, the gate terminals of Q2 and Q4 to negative due to the voltage drop on common node $V_{CN}$. FET Q2 is cut-off faster than FET Q4. When Q2 begins to cut-off, the voltage on the drain terminal D of Q2 begins to increase, thus causing the base voltage of n-p-n bipolar transistor Q3 to increase and Q3 to become more conductive. When Q3 becomes more conductive the reticle LED bias voltage V2 at the anode of reticle LED D1 increases and therefore the reticle brightness projected on the cathode of the image intensifier increases linearly with screen current Is. The bias resistor R5 may be about 18 kiloohms and the potentiometer R6 may be a 2 kiloohm potentiometer which is manually set at first to provide a desired reticle light level, and is not changed during the automatic brightness control. Note that FET transistor Q4 is not pinched-off yet even though Q2 is partially pinched-off.

If screen current Is increases further to an automatic brightness control current limiting mode, FET Q4 starts to be pinched-off. Consequently, n-p-n bipolar transistor Q5 will become more conductive due to an increase in voltage at the drain terminal of Q4 and the base terminal of Q5. The current supplied to the base terminal of MCP OSC circuit 20 base drive n-p-n transistor Q7 will be reduced accordingly since Q5 is now driven harder and the voltage at the common connection between the collector terminal of Q5 and the base terminal of Q7 are reduced. When the current to the MCP OSC circuit 20 is reduced the eventual voltage at terminal VF is reduced accordingly, in the well known manner, since current to the base terminal of n-p-n transistor Q8 is reduced. The circuit shown by dashed line 70 is a constant current source to sustain operation of the MCP OSC circuit 20. However, it is the current supplied to the base terminal of Q7 from the collector terminal of Q5 that provides a variable voltage at terminal VF. It should be noted here that when the MCP OSC voltage is reduced, the screen current Is is held constant by internal action of the image intensifier tube.

The variable voltage at VF is always of a positive polarity due to the arrangement of guiding diode D2 and capacitor C1. However, the amount of the voltage at VF obviously varies inversely with the amount of screen current Is, and in fact limits the Is by internal action as noted above. The voltage at terminal VF is the feedback voltage applied to a feedback circuit comprised of resistor R3 and partially conducting p-n-p transistor Q1 to the gate terminal of FET Q2 to further bias Q2 toward pinch-off. As the voltage at terminal VF becomes less positive, Q1 becomes less conductive and the gate terminal at FET Q2 becomes more negative with the result that Q2 becomes more cut-off. This results in more of the reticle LED bias voltage V2 being applied across the reticle LED D1 and thus a brighter reticle on the cathode of the image intensifier.

We wish it to be understood that we do not desire to be limited to the exact details of construction shown and described, for obvious modifications will occur to a person skilled in the art.

We claim:

1. An automatic reticle brightness control circuit means for maintaining the brightness of a reticle commensurate with the brightness of an object image incident upon the cathode of an image intensifier tube under varying input light conditions, the means comprising:

a screen power supply oscillator and voltage multiplier for providing a direct current bias voltage on the screen of said image intensifier tube;

a screen current sensing circuit having on one side thereof a common node connected to the secondary winding of said screen power supply oscillator and having another side connected to a ground potential;

an automatic brightness control circuit having an input connected to said common node and an output therefrom;

an n-p-n transistor base controlled MCP OSC circuit for providing a variable feedback direct current voltage at a feedback terminal in response to a signal from the output of said automatic brightness control circuit applied to the base of said n-p-n transistor;

a feedback circuit having an input connected to said variable feedback direct current voltage at said feedback terminal and an output therefrom providing a voltage in direct relation to the value of said variable feedback direct current voltage;

a reticle LED direct current voltage source for providing bias voltage to a reticle LED; and a reticle brightness control circuit, said reticle brightness control circuit having two common inputs and an output therefrom for controlling the bias voltage to said reticle LED wherein a first of said common inputs is connected to said common node of said screen current sensing circuit and a second of said common inputs is connected to the output of said feedback circuit whereby as screen current varies proportionally to the object image input light and said screen current flows through said current sensing circuit the voltage at said common node decreases as screen current increases and causes the first of said common inputs to said reticle brightness control circuit to vary the bias voltage across said reticle LED directly with the increase in screen current and whereby as the screen current further increases past an automatic brightness control level said automatic brightness control circuit base controls said n-p-n transistor base controlled MCP OSC circuit to change said variable feedback direct current voltage inversely with increasing screen current in which said variable feedback direct current voltage source controls said second of said common inputs to said reticle brightness control circuit for additionally increasing current flow through said reticle LED directly with increasing screen current to keep the reticle visible to an observer under varying light conditions of said object image.

2. A circuit means as set forth in claim 1 wherein said automatic brightness control circuit and said reticle brightness control circuit both comprise an N-channel enhancement mode FET having their gate terminals connected to said common node as inputs thereto with the gate terminal of said reticle brightness control circuit further connected to the output of said feedback circuit to form said first and second of said common inputs and having source terminal connected to ground potential and their drain terminals connected to the base terminals of n-p-n transistors and to said reticle LED direct current voltage source, said n-p-n transistors having their collector terminals connected to said reticle LED direct current voltage source with the collector terminal of said n-p-n transistor in said automatic brightness control circuit further directly connected to the base terminal of a base n-p-n transistor driven MCP OSC circuit and the emitter terminal of said n-p-n transistor in said automatic brightness control circuit connected directly to ground potential with the emitter terminal of said n-p-n transistor in said reticle brightness control circuit connected to the anode of a reticle LED and the cathode of said reticle LED connected to ground potential, wherein the pinch-off voltage of the N-channel enhancement mode FET of said reticle brightness control circuit is at a lower voltage than the pinch-off voltage of the N-channel enhancement mode FET of said automatic brightness control circuit.

3. A circuit means as set forth in claim 2 wherein said source terminal of said N-channel enhancement mode FET of said reticle brightness control circuit is connected to ground potential through a 2 kiloohm potentiometer in which said 2 kiloohm potentiometer is used to set the initial current level flow through said reticle LED.

4. A circuit means as set forth in claim 3 wherein said feedback circuit comprises a p-n-p transistor biased into partial conduction and having a collector terminal connected to the gate of the N-channel enhancement mode FET of the reticle brightness control circuit and base and emitter terminals connected to a voltage feedback terminal in said MCP OSC circuit wherein the voltage feedback terminal is always positive but decreases with further increase of screen current past the ABC limiting level caused by an increase in object image input source brightness whereby the decrease in voltage at the base and emitter of said p-n-p transistor applies a more negative voltage at the gate of said N-channel enhancement mode FET of said reticle brightness control circuit for driving the current through said reticle LED harder.

* * * * *